US010344684B2

(12) United States Patent
 Matsuda

(10) Patent No.: US 10,344,684 B2
(45) Date of Patent: Jul. 9, 2019

(54) CONTROL DEVICE OF ENGINE AND CONTROL METHOD OF ENGINE

(71) Applicant: NISSAN MOTOR CO., LTD., Yokohama-shi, Kanagawa (JP)

(72) Inventor: Tsuyoshi Matsuda, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/753,099

(22) PCT Filed: Aug. 20, 2015

(86) PCT No.: PCT/JP2015/073399
§ 371 (c)(1),
(2) Date: Feb. 15, 2018

(87) PCT Pub. No.: WO2017/029763
PCT Pub. Date: Feb. 23, 2017

(65) Prior Publication Data
US 2019/0010862 A1    Jan. 10, 2019

(51) Int. Cl.
*F02D 15/02* (2006.01)
*F02D 15/00* (2006.01)
(Continued)

(52) U.S. Cl.
CPC ............ *F02D 15/02* (2013.01); *F02B 75/045* (2013.01); *F02D 15/00* (2013.01); *F02D 23/005* (2013.01); *F02D 41/0007* (2013.01); *F02D 41/12* (2013.01); *F02D 41/1446* (2013.01); *F02D 41/1448* (2013.01); *F02B 37/183* (2013.01); *F02D 2200/101* (2013.01); *F02D 2200/1004* (2013.01); *Y02T 10/144* (2013.01)

(58) Field of Classification Search
CPC .. F02B 37/183; F02B 75/045; F02D 41/0007; F02D 41/1448; F02D 41/1446; F02D 23/005; F02D 15/02; F02D 41/12; F02D 2200/1004; F02D 2200/101
See application file for complete search history.

(56) References Cited

U.S. PATENT DOCUMENTS 4,233,815 A * 11/1980 Melchior .............. F02B 37/013
                                                        60/606
4,450,814 A *  5/1984 Sawamoto ............. F02B 37/16
                                                        123/198 D
(Continued)

FOREIGN PATENT DOCUMENTS

JP        58048716 A  *  3/1983  .............. F02B 37/18
JP    2001-227367 A       8/2001
(Continued)

*Primary Examiner* — Sizo B Vilakazi
*Assistant Examiner* — Brian R Kirby
(74) *Attorney, Agent, or Firm* — Foley & Lardner LLP

(57) ABSTRACT

An engine includes a variable compression-ratio mechanism adapted to change a compression ratio of an engine and a supercharger adapted to supply a compressed air to the engine. An engine control device that controls the engine controls the variable compression-ratio mechanism by setting target compression ratio such that the higher responsiveness of a supercharging pressure rise by the supercharger is, the lower the target compression ratio is.

12 Claims, 15 Drawing Sheets

(51) Int. Cl.
*F02D 23/00* (2006.01)
*F02D 41/00* (2006.01)
*F02D 41/12* (2006.01)
*F02D 41/14* (2006.01)
*F02B 75/04* (2006.01)
*F02B 37/18* (2006.01)

(56) References Cited

U.S. PATENT DOCUMENTS

| | | | | |
|---|---|---|---|---|
| 4,603,552 A * | 8/1986 | Kido | | F02B 39/16 123/198 D |
| 4,996,966 A * | 3/1991 | Hitomi | | F01L 1/34403 123/559.3 |
| 6,390,035 B2 | 5/2002 | Moteki et al. | | |
| 6,516,757 B2 * | 2/2003 | Aoyama | | F02B 67/00 123/78 R |
| 6,915,766 B2 * | 7/2005 | Aoyama | | F02B 75/045 123/406.29 |
| 2001/0047778 A1 * | 12/2001 | Aoyama | | F02B 67/00 123/78 R |
| 2005/0193810 A1 * | 9/2005 | Gladden | | F01D 21/003 73/114.01 |
| 2007/0028890 A1 * | 2/2007 | Brown | | F02D 41/0007 123/299 |
| 2007/0289302 A1 * | 12/2007 | Funke | | F02D 23/00 60/602 |
| 2008/0022678 A1 * | 1/2008 | Irisawa | | F01N 3/101 60/600 |
| 2008/0148827 A1 * | 6/2008 | Keski-Hynnila | | G01M 15/05 73/114.31 |
| 2011/0005496 A1 * | 1/2011 | Hiraya | | F02D 15/02 123/48 B |
| 2012/0031377 A1 * | 2/2012 | Okada | | F02D 13/0226 123/480 |
| 2013/0047957 A1 * | 2/2013 | Breuer | | F02D 41/10 123/406.14 |
| 2013/0073187 A1 * | 3/2013 | Koch | | F02D 41/0007 701/104 |
| 2013/0233281 A1 * | 9/2013 | Morinaga | | F02D 41/401 123/478 |
| 2014/0261336 A1 * | 9/2014 | Takahashi | | F02D 15/02 123/48 R |
| 2015/0219024 A1 * | 8/2015 | Kurashima | | F02B 27/0273 123/321 |
| 2015/0267624 A1 * | 9/2015 | Kemmerling | | F02D 13/0207 123/90.15 |

FOREIGN PATENT DOCUMENTS

| | | | | |
|---|---|---|---|---|
| JP | 2002-070601 A | 3/2002 | | |
| JP | 2005-155507 A | 6/2005 | | |
| JP | 2008-095651 A | 4/2008 | | |
| JP | 2011-021524 A | 2/2011 | | |
| JP | 2011021524 A * | 2/2011 | ............ | Y02T 10/144 |
| JP | 2012-225179 A | 11/2012 | | |
| JP | 2013127221 A * | 6/2013 | ............ | Y02T 10/144 |
| JP | 2014-159758 A | 9/2014 | | |

* cited by examiner (A) HIGH COMPRESSION RATIO POSITION (B) LOW COMPRESSION RATIO POSITION

CONTROL DEVICE OF ENGINE AND CONTROL METHOD OF ENGINE

TECHNICAL FIELD

The present invention relates to a control device of an engine and a control method of an engine.

BACKGROUND ART

JP2011-21524A discloses that, in a variable compression ratio engine having a turbo supercharger, when re-acceleration is performed after deceleration, a compression ratio is lowered after it is determined that knocking is likely to occur.

SUMMARY OF INVENTION

According to the aforementioned document, the compression ratio is lowered after it is determined that knocking is likely to occur, but if rising of a supercharging pressure by the turbo supercharger is faster than a compression-ratio changing speed, the knocking cannot be suppressed.

An object of the present invention is to suppress knocking in a variable compression-ratio engine having a supercharger.

According to one embodiment of this invention, an engine comprises a variable compression-ratio mechanism adapted to change a compression ratio of an engine and a supercharger adapted to supply a compressed air to the engine. An engine control device that controls the engine controls the variable compression-ratio mechanism by setting target compression ratio such that the higher responsiveness of a supercharging pressure rise by the supercharger is, the lower the target compression ratio is.

DESCRIPTION OF EMBODIMENTS

Embodiments of the present invention will be described below by referring to the attached drawings and the like.

First Embodiment

Figure 1:
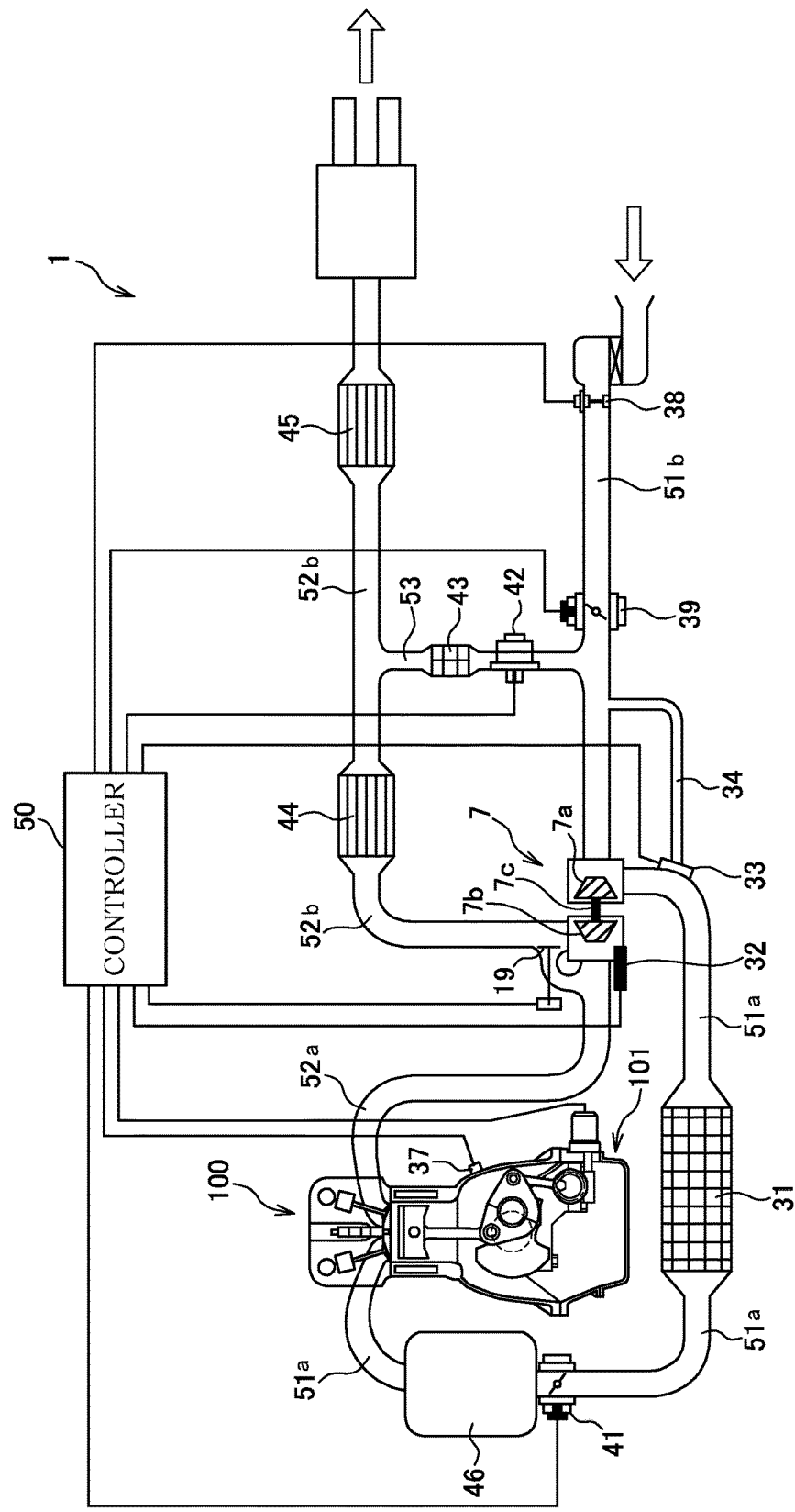
FIG. 1 is an explanatory view of entire configuration of an engine system.

FIG. 1 is an explanatory view of entire configuration of an engine system. An engine 100 in an engine system 1 is a variable compression-ratio engine. The variable compression-ratio engine is capable of changing a mechanical compression ratio by operating an actuator. An example of a mechanism of the variable compression-ratio engine will be described later.

Moreover, the engine 100 includes a turbo supercharger 7. The turbo supercharger 7 includes a compressor 7a and a turbine 7b connected by a shaft 7c. The compressor 7a is disposed in an intake passage 51a of the engine 100. The turbine 7b is disposed in an exhaust passage 52a of the engine 100. As a result, when the turbine 7b is rotated by exhaust energy of the engine 100, the compressor 7a is also rotated and press-feeds an intake air to a downstream side. Here, the exhaust energy refers to energy of an exhaust of the engine driving an exhaust-type supercharger like the turbo supercharger 7, and as an index of its intensity, a revolution speed of the supercharger, an exhaust temperature or a pressure on an upstream side of the supercharger can be exemplified. In the following explanation, a revolution speed of the turbo supercharger 7 is referred to simply as a T/C revolution speed in some cases. The T/C revolution speed is obtained by a T/C revolution speed sensor 32.

Moreover, the engine 100 includes a crank angle sensor 37. The crank angle sensor 37 detects a crank angle in the engine 100. The crank angle sensor 37 is connected to a controller 50, and the controller 50 can obtain a crank angle of the engine 100.

Moreover, on the intake passage 51a of the engine 100 on a downstream side of the compressor 7a, an intercooler 31 is disposed. Moreover, in the intake passage 51a, an electronic control throttle 41 is provided on a downstream of the intercooler 31, and a throttle opening is controlled by the controller 50. Moreover, on a further downstream of the electronic control throttle 41, a collector tank 46 is provided.

A recirculation passage 34 branches from the intake passage 51a and is connected to an intake passage 51b. The recirculation passage 34 bypasses the compressor 7a. On the recirculation passage 34, a recirculation valve 33 is provided, and opening/closing thereof is controlled by the controller 50. By controlling opening/closing of the recirculation valve 33, a supercharging pressure on the downstream of the compressor 7a is adjusted so as not to become too high.

Moreover, an airflow meter 38 is provided on the intake passage 51b on the upstream side of the compressor 7a. The airflow meter 38 is connected to the controller 50. Then, the controller 50 obtains an intake amount passing through the intake passage 51b.

On the exhaust passage 52a, a bypass passage bypassing the turbine 7b is provided. And a waste gate valve 19 for controlling opening/closing of this bypass passage is provided. The waste gate valve 19 has its opening/closing controlled by the controller 50.

On an exhaust passage 52b, exhaust catalysts 44 and 45 for exhaust purification are provided. For the exhaust catalysts 44 and 45, three-way catalysts or the like are used.

The intake passage 51b and the exhaust passage 52b are connected through an EGR passage 53. On the EGR passage 53, an EGR cooler 43 is provided. Moreover, on the EGR passage 53, an EGR valve 42 is provided. The EGR valve 42 is connected to the controller 50. Then, in accordance with an operating condition of the engine 100, opening of the EGR valve 42 is controlled by the controller 50.

On the exhaust passage 52b, an admission valve 39 is provided between a connection portion with the EGR passage 53 and the airflow meter 38. The admission valve 39 has its opening/closing controlled by the controller 50, and a differential pressure between the intake passage 51b and the exhaust passage 52b is generated. Then, by means of this differential pressure, an EGR gas from the exhaust passage 52 can be introduced more easily.

The controller 50 reads in an output from the aforementioned various sensors and the other sensors, not shown, and executes control of ignition timing, an air-fuel ratio and the like on the basis of them. Moreover, the controller 50 executes compression-ratio changing control which will be described later.

Subsequently, an example of a mechanism of the variable compression-ratio engine 100 will be described. As the variable compression-ratio engine 100, a variable compression-ratio engine configured as follows can be employed, for example.

Figure 2:
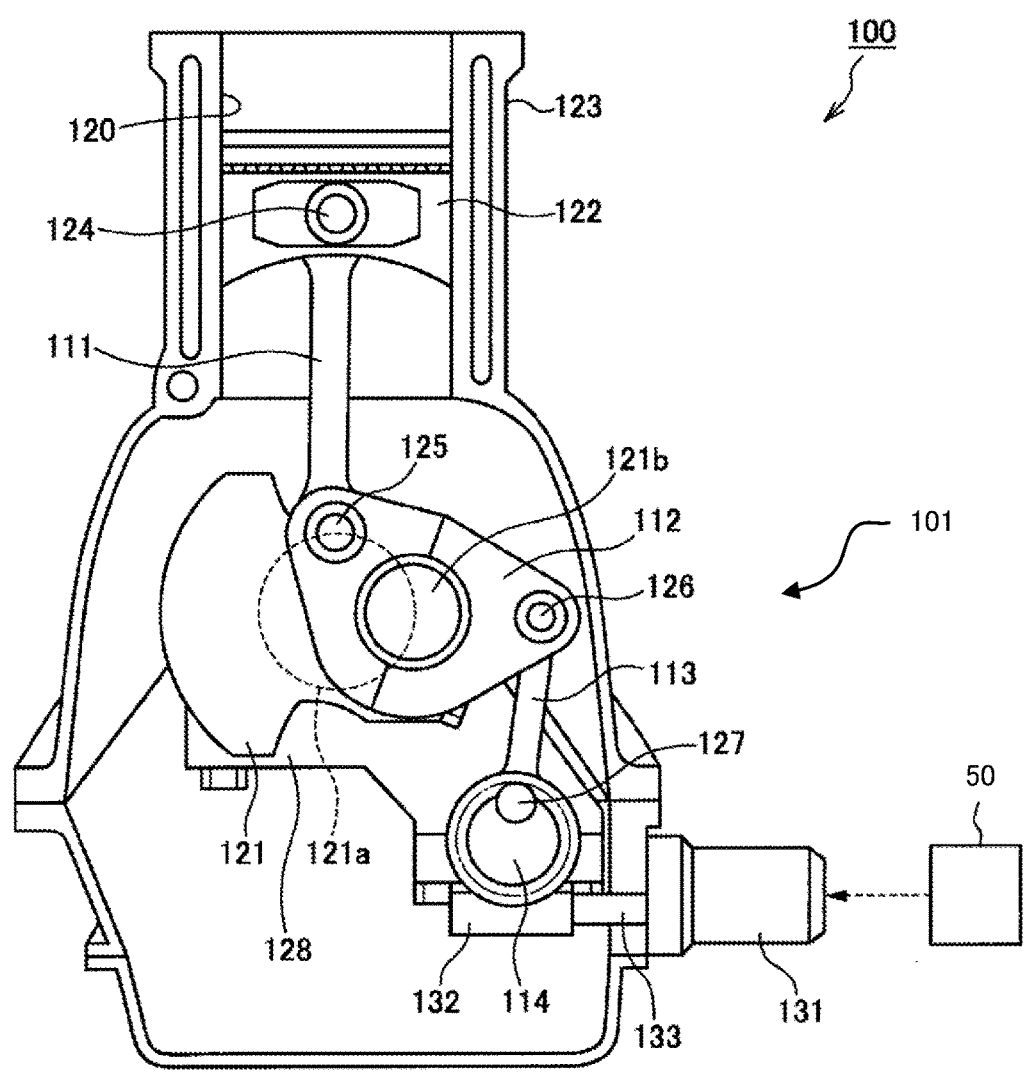
FIG. 2 is an explanatory view of a variable compression-ratio engine.

FIG. 2 is an explanatory view of the variable compression-ratio engine. The engine 100 includes a variable compression-ratio mechanism 101 which continuously changes the mechanical compression-ratio by changing a piston stroke. In this embodiment, a double-link variable compression-ratio mechanism which is well-known by JP2001-227367A, for example, is applied as a variable compression-ratio mechanism. Hereinafter, the engine 100 including this double-link variable compression-ratio mechanism is referred to as the "variable compression-ratio engine 100".

In the variable compression-ratio engine 100, a piston 122 and a crank shaft 121 are coupled by two links (upper link (first link) 111, lower link (second link) 112), and the lower link 112 is controlled by a control link (third link) 113 so as to change the mechanical compression ratio.

The upper link 111 has its upper end coupled to the piston 122 through a piston pin 124 and a lower end coupled to one end of the lower link 112 through a coupling pin 125. The piston 122 is slidably fitted with a cylinder 120 formed on a cylinder block 123 and reciprocates in the cylinder 120 by receiving a combustion pressure.

The lower link 112 has one end coupled to the upper link 111 through the coupling pin 125 and the other end coupled to the control link 113 through a coupling pin 126. Moreover, the lower link 112 has a crank pin 121b of the crank shaft 121 inserted into a coupling hole substantially at a center and swing by using the crank pin 121b as a center shaft. The lower link 112 can be split into right and left two members. The crank shaft 121 includes a plurality of journals 121a and the crank pin 121b. The journal 121a is rotatably supported by the cylinder block 123 and a ladder frame 128. The crank pin 121b is eccentric from the journal 121a by a predetermined amount, and here, the lower link 112 is coupled capable of swing.

The control link 113 is coupled to the lower link 112 through the coupling pin 126. Moreover, the control link 113 has the other end coupled to a control shaft 114 through a coupling pin 127. The control link 113 swings around this coupling pin 127. Moreover, a gear is formed on the control shaft 114, and this gear is meshed with a pinion 132 provided on a rotating shaft 133 of a compression-ratio changing actuator 131. The control shaft 114 is rotated by the compression-ratio changing actuator 131, and the coupling pin 127 is moved.

Figure 3:
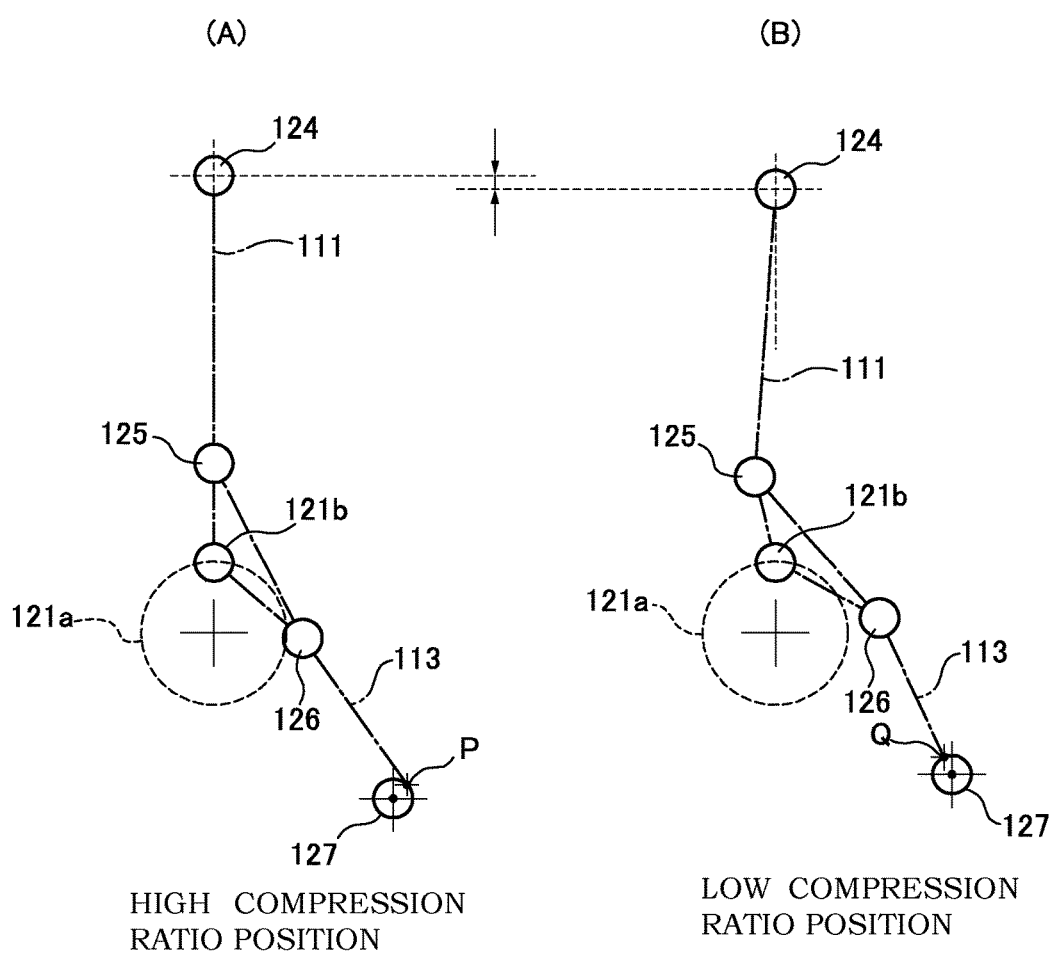
FIG. 3 is a first view for explaining a compression-ratio changing method by the variable compression-ratio engine.
Figure 4:
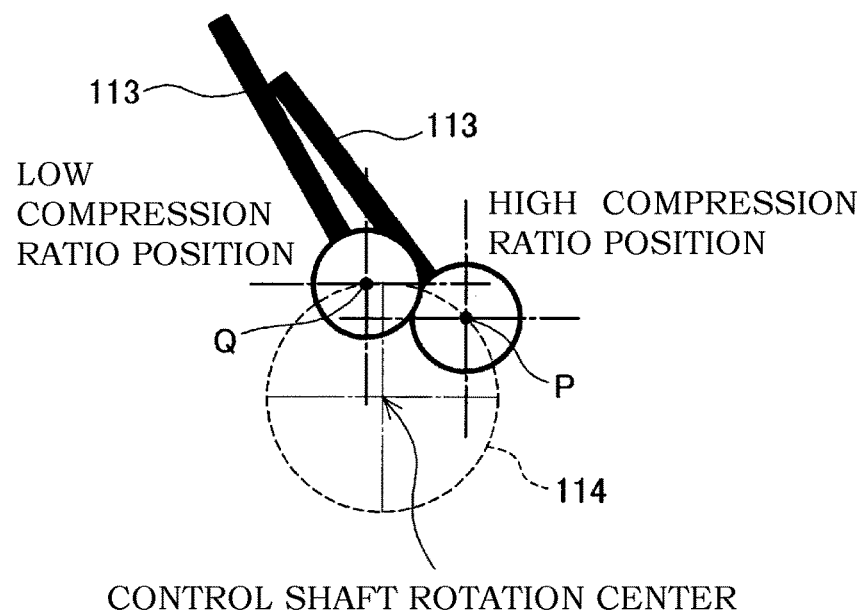
FIG. 4 is a second view for explaining a compression-ratio changing method by the variable compression-ratio engine.

FIG. 3 is a first view for explaining a compression-ratio changing method by the variable compression-ratio engine. FIG. 4 is a second view for explaining the compression-ratio changing method by the variable compression-ratio engine.

The variable compression-ratio engine 100 changes the mechanical compression ratio by rotating the control shaft 114 by control of the compression-ratio changing actuator 131 by the controller 50 so as to change a position of the coupling pin 127. As illustrated in (A) in FIG. 3 and FIG. 4, for example by setting the coupling pin 127 at a position P, a top dead center position (TDC) becomes high, and a compression ratio becomes high.

Then, as illustrated in FIG. 3(B) and FIG. 4, by setting the coupling pin 127 at a position Q, the control link 113 is pushed up, and the position of the coupling pin 126 rises. As a result, the lower link 112 is rotated in a counterclockwise direction around the crank pin 121b, the coupling pin 125 lowers, and the position of the piston 122 at the piston top dead center lowers. Therefore, the mechanical compression ratio becomes a low compression ratio.

The variable compression-ratio engine as above has been described in this embodiment, but a form of the variable compression-ratio engine is not limited to that.

Figure 5:
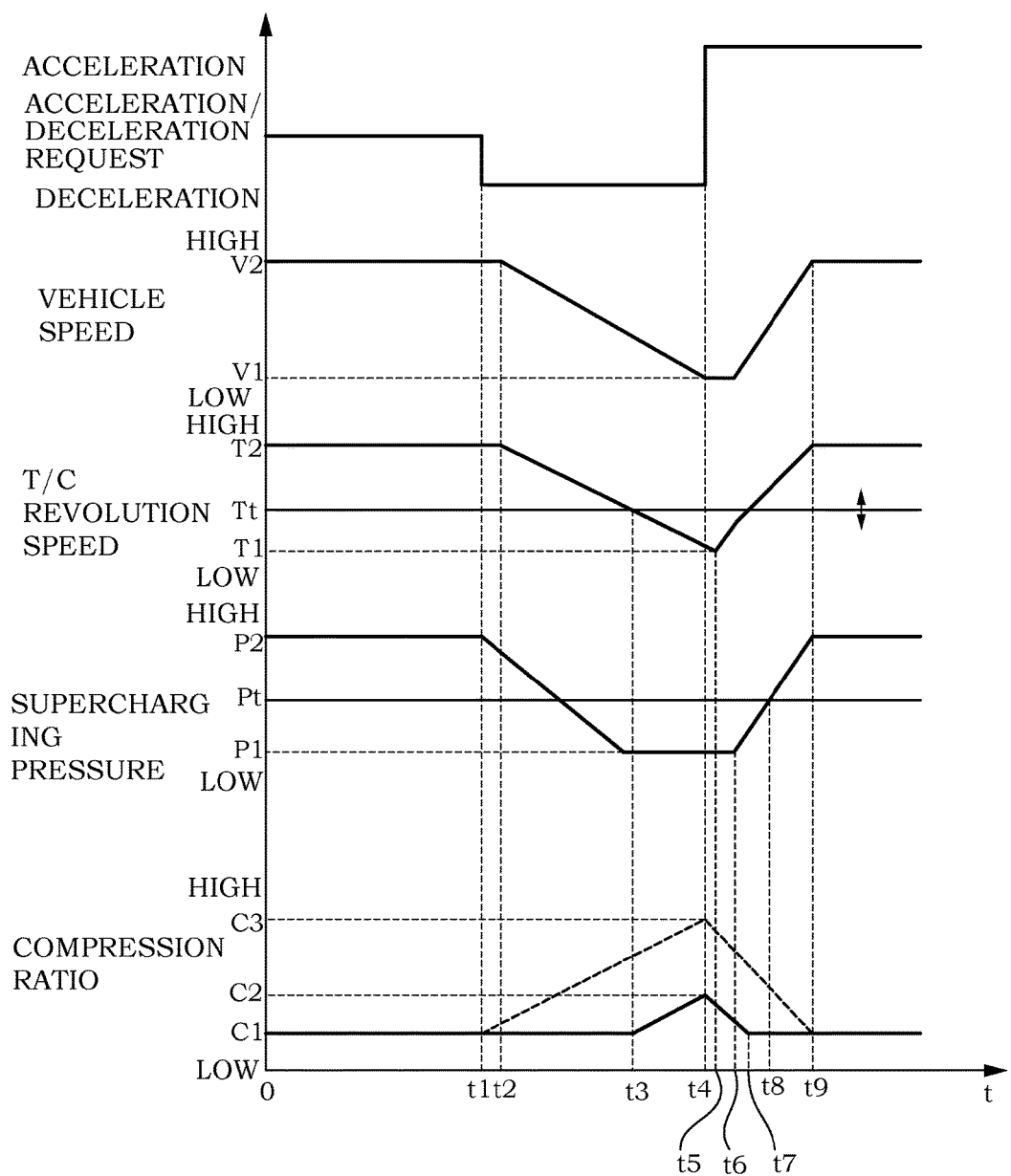
FIG. 5 is a time chart of compression-ratio changing control.

FIG. 5 is a time chart of the compression-ratio changing control. In FIG. 5, with a lateral axis for time and a vertical axis for an acceleration/deceleration request, a vehicle speed, a T/C revolution speed, a supercharging pressure, and a mechanical compression ratio are indicated. In the mechanical compression ratio in FIG. 5, a solid line indicates the mechanical compression ratio in this embodiment, and a broken line indicates the mechanical compression ratio in a reference example. Here, first, the time chart in the reference example will be described and then, the time chart in this embodiment will be described in comparison with the reference example so as to explain a concept of this embodiment.

Here, the acceleration/deceleration request is an acceleration/deceleration request to the engine 100. When the engine system 1 further has an electric motor as power, the acceleration/deceleration request to the engine 100 is also made different by an output borne by the electric motor. Even if the acceleration request is made, for example, if the electric motor bears most of the load, it can be a deceleration request made to the engine 100 in some cases.

When an acceleration request is made to the engine 100, the controller 50 controls such that the electronic control throttle 41 is further opened. On the other hand, when a deceleration request is made to the engine 100, control is executed such that the electronic control throttle 41 is further closed. Moreover, when there is neither the acceleration request nor the deceleration request to the engine 100, the opening of the electronic throttle 41 is maintained as it is. Thus, the acceleration/deceleration request to the engine 100 corresponds to the opening of the electronic control throttle 41.

Until time t1, the acceleration/deceleration request is neutral. Until the time t1, the vehicle speed is maintained at high V2, and the T/C revolution speed is also maintained at high T2. Moreover, since the T/C revolution speed is high, the supercharging pressure is also maintained at high P2. However, since the supercharging pressure is maintained high, the mechanical compression ratio is maintained at a low mechanical compression ratio C1 for knocking suppression.

At the time t1, the acceleration/deceleration request becomes the deceleration request. Then, after a slight delay, the vehicle speed begins to lower at time t2. Moreover, after a slight delay, the T/C revolution speed also begins to lower at the time t2. The supercharging pressure begins to lower immediately after the time t1 when the acceleration/deceleration request becomes the deceleration request.

In the reference example, at the time t1 when the acceleration/deceleration request becomes a deceleration request, a change of the mechanical compression ratio is started so that the mechanical compression ratio becomes high. This is because, since the T/C revolution speed lowers and the supercharging pressure lowers with deceleration of the engine revolution speed, even if the mechanical compression ratio is set high, knocking hardly occurs, and fuel efficiency can be improved.

After that, at the time t4, the vehicle speed lowers as low as to V1, and the T/C revolution speed also lowers close to T1. Moreover, the supercharging pressure also lowers to P1. Here, it is assumed that the acceleration request is made again at the time t4. Then, the T/C revolution speed immediately starts to rise. When the T/C revolution speed rises, the supercharging pressure also rises and thus, control is executed so as to lower the mechanical compression ratio so that knocking does not occur.

In the engine, there is a request for a low compression ratio that knocking can easily occur unless the mechanical compression ratio is lowered to a certain compression ratio at a certain supercharging pressure or more. In the case of the supercharging pressure higher than a supercharging pressure threshold value Pt indicated in FIG. 5, for example, knocking easily occurs if the mechanical compression ratio has not been lowered to C1. Thus, there is a request to lower the mechanical compression ratio to C1 by the time when the supercharging pressure rises from P1 to the supercharging pressure threshold value Pt.

In FIG. 5, the acceleration/deceleration request becomes the acceleration request at the time t4, but the mechanical compression ratio begins to lower immediately after the time t4. Moreover, with a delay after the time t4, the T/C revolution speed begins to rise at time t5, and with a further delay after this, the supercharging pressure begins to rise at time t6. However, since the changing speed of the mechanical compression ratio is lower than the rising speed of the T/C revolution speed, the supercharging pressure rises faster than lowering of the mechanical compression ratio. Then, as in the reference example, at a point of time t8 when the supercharging pressure becomes the supercharging pressure threshold value Pt, the mechanical compression ratio is still in a state higher than C1. And the mechanical compression ratio continues to be in the state higher than C1 until time t7.

As described above, if the supercharging pressure is higher than the supercharging pressure threshold value Pt, if the mechanical compression ratio is not lowered to C1, knocking can easily occur. That is, as an effective compression ratio, it can be considered to be a compression ratio at which knocking can easily occur. If knocking can occur, a measure of retarding ignition timing or the like in order to avoid this is needed. And as a result, a problem occurs that a torque response deteriorates or an in-use fuel economy lowers.

On the other hand, in this embodiment, even if there is a deceleration request at the time t1, the mechanical compression ratio is not changed until the T/C revolution speed falls to the T/C revolution speed threshold value Tt or less, and the mechanical compression ratio is maintained at the low compression ratio C1. Then, after the T/C revolution speed falls to the T/C revolution speed threshold value Tt or less, the control is executed such that the mechanical compression ratio is increased.

Thus, in FIG. 5, the mechanical compression ratio is increased at the time t3 and after. Since the reference example and this embodiment use the common variable compression-ratio mechanism 101, the changing speeds of the mechanical compression ratios of the both are the same. Thus, inclination of a line segment representing the mechanical compression ratio of this embodiment from the time t3 to the time t4 is substantially equal to the inclination of a line segment representing the mechanical compression ratio of the reference example from the time t1 to the time t4. Similarly, the inclination of a line segment representing the mechanical compression ratio of this embodiment from the time t4 to the time t7 is substantially equal to the inclination of a line segment representing the mechanical compression ratio of the reference example from the time t4 to the time t9.

As described above, since start timing to increase the mechanical compression ratio is delayed until the T/C revolution speed lowers to the T/C revolution speed threshold value Tt, even if the acceleration request is made again at the time t4, the mechanical compression ratio has been raised only to C2.

In this embodiment, too, control is executed so that, when the acceleration/deceleration request becomes the acceleration request, the mechanical compression ratio is lowered. In this embodiment, since the mechanical compression ratio has become C2 at the time t4, even if the control to lower the mechanical compression ratio is started here, the mechanical compression ratio can be lowered to C1 until the time t7 before the time t8 when the supercharging pressure reaches the supercharging pressure threshold value Pt.

The case where the mechanical compression ratio is increased to C2 is described here, but the mechanical compression ratio may be higher than C2 as long as the mechanical compression ratio can be lowered to C1 by the time t8. Such mechanical compression ratio is a target compression ratio which will be described later.

By executing control as in this embodiment, even if lowering of the mechanical compression ratio is started at the time t4 and after, the mechanical compression ratio can be lowered to C1 before the time t8 when the supercharging pressure reaches the supercharging pressure threshold value Pt. And occurrence of knocking at the re-acceleration request after the deceleration request can be suppressed.

Subsequently, the compression ratio changing control for realizing the time chart in the aforementioned embodiment will be described by referring to a flowchart.

Figure 6:
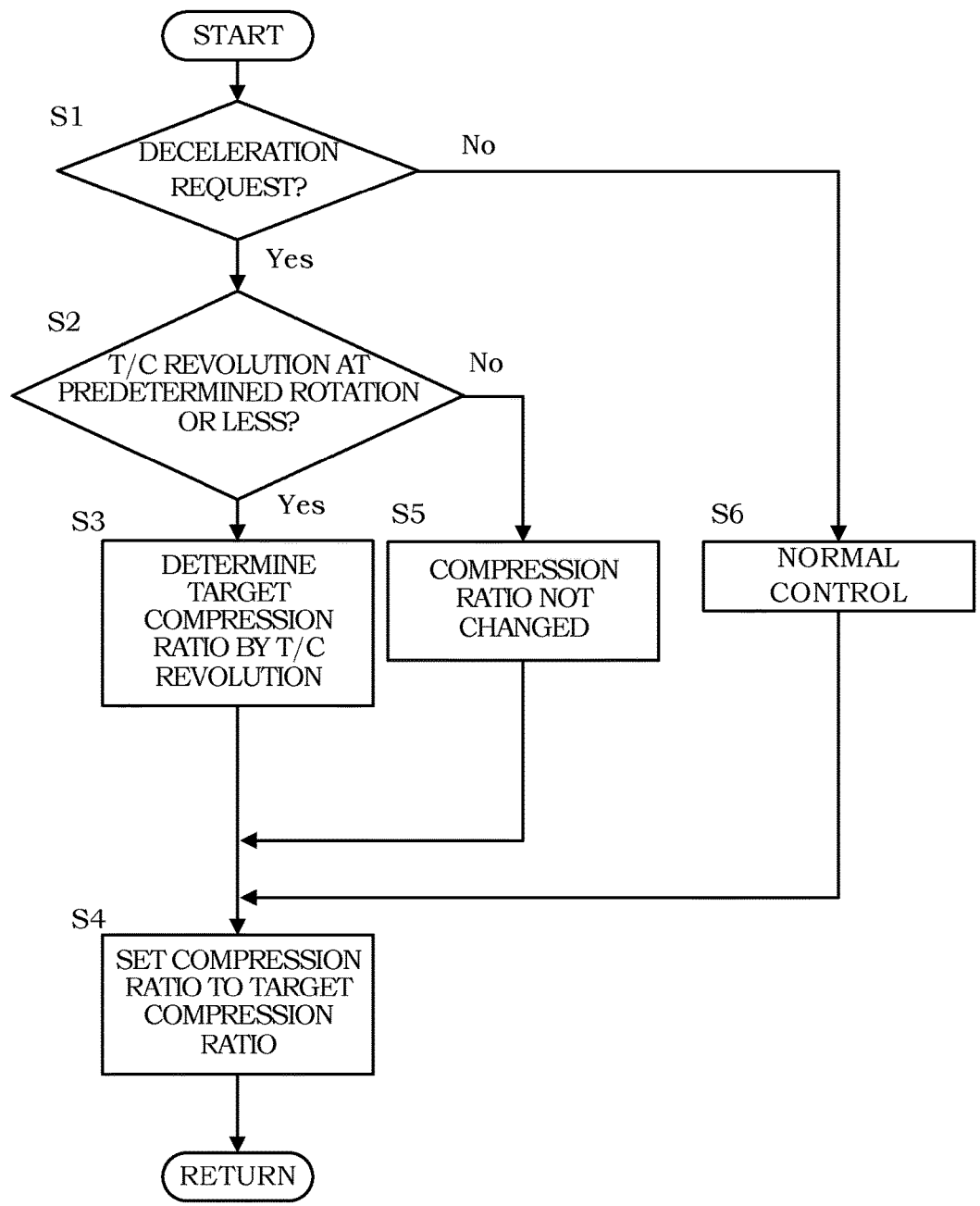
FIG. 6 is a flowchart of the compression-ratio changing control.

FIG. 6 is a flowchart of the compression ratio changing control. This control routine is executed by the controller 50. This routine is repeatedly executed at a short interval of approximately 10 milliseconds, for example.

The controller 50 determines whether the acceleration/deceleration request is a deceleration request to the engine 100 or not (S1). Whether the acceleration/deceleration request is the deceleration request or not can be determined on the basis of the opening of the electronic control throttle 41 as described above.

If it is determined at Step S1 that the acceleration/deceleration request is the deceleration request, the controller 50 determines whether or not the T/C revolution speed is the T/C revolution speed threshold value Tt or less (S2). The T/C revolution speed threshold value is a trigger for starting the control of increasing the mechanical compression ratio as described above.

The T/C revolution speed threshold value Tt is a T/C revolution speed at which the supercharging pressure does not reach the supercharging pressure threshold value Pt until the mechanical compression ratio returns to the mechanical compression ratio (C1 in FIG. 5) which can suppress knocking even if the acceleration/deceleration request switches from the deceleration request to the acceleration request and the T/C revolution speed rises while the mechanical compression ratio is lowered.

Figure 7:
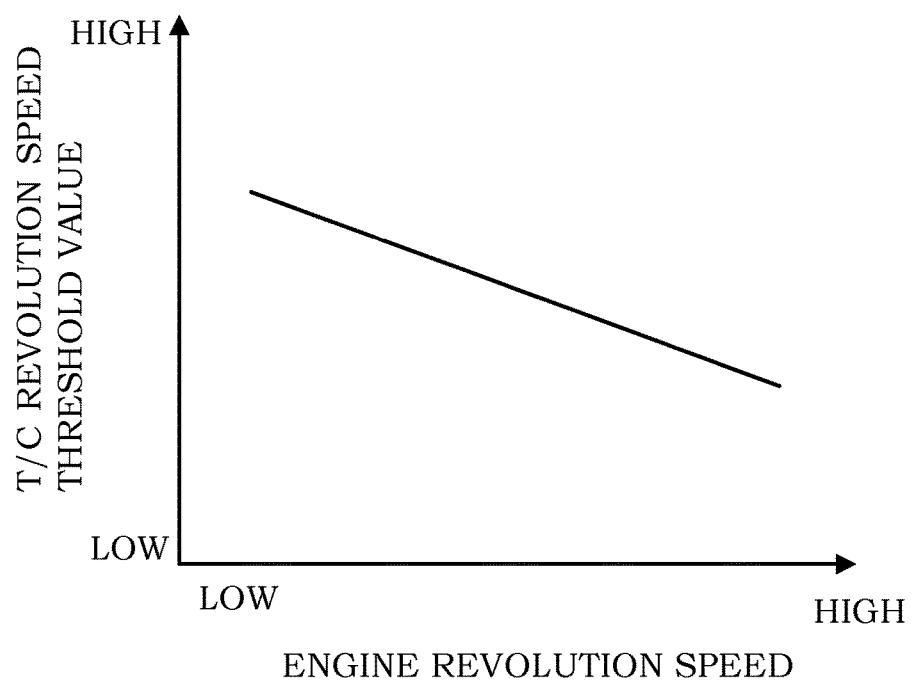
FIG. 7 is a map of a T/C revolution speed threshold value acquired from an engine revolution speed.

FIG. 7 is a map of the T/C revolution speed threshold value acquired from the engine revolution speed. In the map in FIG. 7, the lateral axis indicates the engine revolution speed, and the vertical axis indicates the T/C revolution speed threshold value. Such map of the T/C revolution speed threshold value is stored in the controller 50. In the map of the T/C revolution speed threshold value illustrated in FIG. 7, as the engine revolution speed increases, the T/C revolution speed threshold value tends to lower. This is because, the higher the engine revolution speed increases, the higher the supercharging pressure increases easily and thus, the T/C revolution speed threshold value needs to be set low.

At Step S2, the controller 50 acquires the current engine revolution speed on the basis of the value from the crank angle sensor 37. Then, the controller 50 acquires the corresponding T/C revolution speed threshold value in accordance with the map of the T/C revolution speed threshold value in FIG. 7 from the acquired engine revolution speed.

Here, it is assumed that the "T/C revolution speed threshold value" is a value changed in accordance with the engine revolution speed, but it may be a constant value.

Then, when the T/C revolution speed is the T/C revolution speed threshold value Tt or less, the controller 50 determines a target compression ratio on the basis of the engine revolution speed and the T/C revolution speed (S3). The controller 50 can acquire the engine revolution speed on the basis of an output from the crank angle sensor 37 as described above. Alternatively, the controller 50 can acquire the T/C revolution speed from the T/C revolution speed sensor 32.

Figure 8:
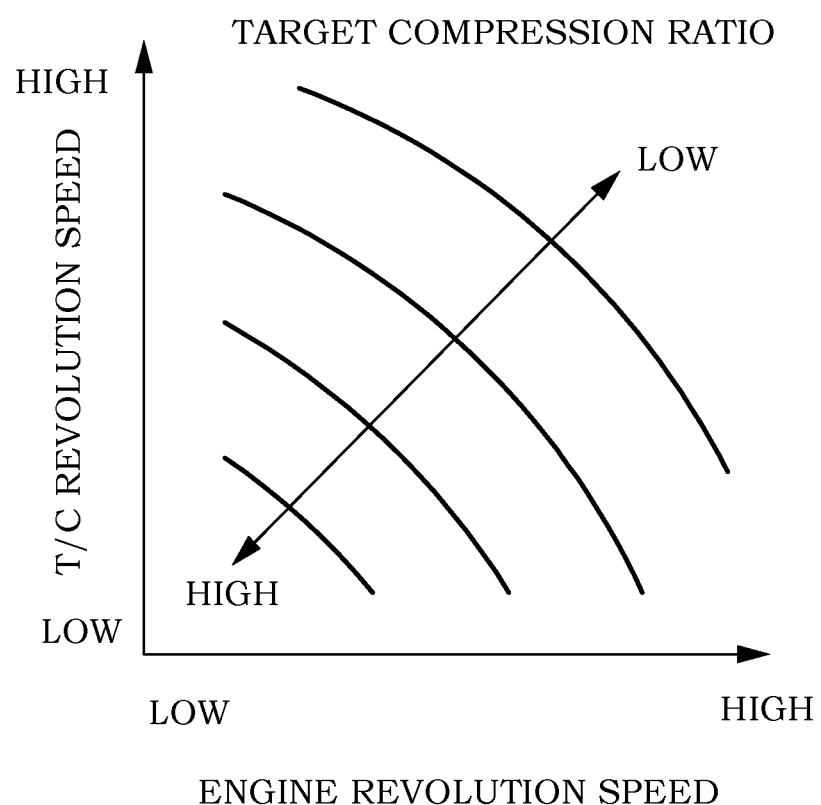
FIG. 8 is a map of a target compression ratio acquired from the engine revolution speed and the T/C revolution speed.

FIG. 8 is a map of a target compression ratio acquired from the engine revolution speed and the T/C revolution speed. In the map of the target compression ratio in FIG. 8, the lateral axis indicates the engine revolution speed, and the vertical axis indicates the T/C revolution speed. The controller 50 stores the map of the target compression ratio illustrated in FIG. 8.

The target compression ratio is a mechanical compression ratio of such a degree of height that can lower the mechanical compression ratio to the low compression ratio C1 (the mechanical compression ratio at which knocking cannot occur easily) in the aforementioned FIG. 5 before the T/C revolution speed reaches the T/C revolution speed threshold value Pt even if the deceleration request switches to the acceleration request.

The higher the engine revolution speed is, the lower the target compression ratio tends to be. When the engine revolution speed is high, the supercharging pressure can easily increase and thus, an intake air amount also increases, and knocking can occur more easily. Thus, the higher the engine revolution speed is, the lower the target compression ratio needs to be set.

Moreover, the higher the T/C revolution speed is, the lower the target compression ratio tends to be. If the T/C revolution speed is high, the supercharging pressure can easily increase and thus, the intake air amount also increases, and knocking can occur more easily. Thus, the higher the T/C revolution speed is, the lower the target compression ratio needs to be set. In other words, the higher the T/C revolution speed is, the higher the responsiveness of the supercharging pressure rise is. Thus, it can be considered that the higher the responsiveness of the supercharging pressure rise by the turbo supercharger 7 is, the lower the target compression ratio is set. Moreover, as described above, as an index of the intensity of the exhaust energy, an exhaust temperature or an exhaust pressure on the upstream side of the supercharger can be exemplified other than the revolution speed of the supercharger and thus, it can be also determined that the higher the exhaust temperature or the exhaust pressure on the upstream side of the supercharger is, the higher the responsiveness of the supercharging pressure rise is.

The controller 50 acquires the target compression ratio by referring to the map of the target compression ratio in FIG. 8 from the engine revolution speed and the T/C revolution speed. Then, the change of the mechanical compression ratio is started so that the acquired target compression ratio is realized (S4).

On the other hand, at Step S2, if it is determined that the T/C revolution speed is not the T/C revolution speed threshold value Tt or less, the controller 50 does not change the mechanical compression ratio (S5). By configuring as above, such control can be executed that the mechanical compression ratio is not increased until the T/C revolution speed falls to the T/C revolution speed threshold value or less (from the time t1 to the time t3 in FIG. 5).

Moreover, the mechanical compression ratio is increased only to the aforementioned target compression ratio even if the mechanical compression ratio is increased after the T/C revolution speed falls to the T/C revolution speed threshold value Tt or less (the time t4 in FIG. 5). Thus, even if the T/C revolution speed rises by the re-acceleration request, the mechanical compression ratio can be lowered to the low compression ratio C1 until the supercharging pressure rises to the supercharging pressure threshold value Pt (the time t7 in FIG. 5). And occurrence of knocking can be suppressed.

At Step S1, if it is determined that the acceleration/deceleration request is not the deceleration request, the controller 50 executes normal control (S6). The normal control is control such that the mechanical compression ratio becomes a set compression ratio. The set compression ratio is a mechanical compression ratio acquired from a load to the engine 100.

Figure 9:
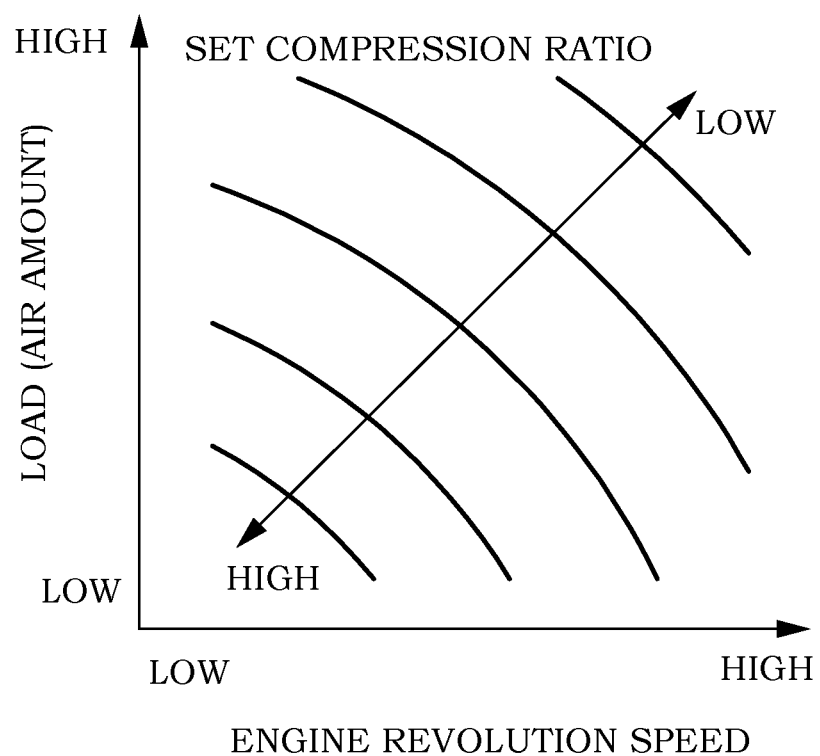
FIG. 9 is a map of a set compression ratio acquired from the engine revolution speed and a load.

FIG. 9 is a map of the set compression ratio acquired from the engine revolution speed and the load. In the map in FIG. 9, the lateral axis indicates the engine revolution speed, and the vertical axis indicates the load to the engine 100. Then, the map of the set compression ratio in FIG. 9 indicates the set compression ratio acquired from the engine revolution speed and the load of the engine 100. The controller 50 stores the map of the set compression ratio illustrated in FIG. 9.

Here, again, the higher the engine revolution speed is, the lower the set compression ratio tends to be. If the engine revolution speed is high, the supercharging pressure can easily rise and thus, the intake air amount increases, and knocking can occur more easily. Thus, the higher the engine revolution speed is, the lower the set compression ratio needs to be set.

Moreover, the higher the load is, the lower the set compression ratio tends to be. The higher the load is, the engine 100 handles the required load by increasing the intake air amount, and as the intake air amount increases, knocking can occur more easily. Thus, the higher the load is, the lower the set compression ratio needs to be set.

The controller 50 acquires the set compression ratio by referring to the map of the set compression ratio in FIG. 9 from the engine revolution speed and the intake air amount. And the control of the engine 100 is executed by starting the change of the mechanical compression ratio so that the acquired set compression ratio is realized.

Figure 10:
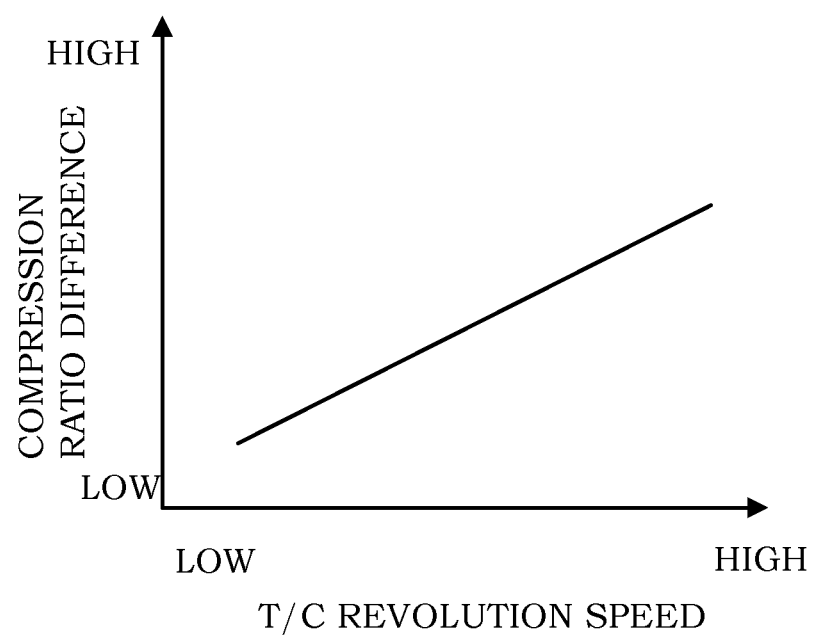
FIG. 10 is a graph in a relationship between the T/C revolution speed and a compression ratio difference.

FIG. 10 is a graph in a relationship between the T/C revolution speed and a compression ratio difference. In the graph in FIG. 10, the lateral axis indicates the T/C revolution speed, and the vertical axis indicates the compression ratio difference. Here, the compression ratio difference is a difference between the set compression ratio and the target compression ratio. The higher the T/C revolution speed becomes, the wider the compression ratio difference tends to be. That is, even if the T/C revolution speed increases, in this embodiment, the target compression ratio is not set as high as the set compression ratio. This is because it is configured such that, by lowering the target compression ratio, even if the acceleration request is made again, the mechanical compression ratio can be returned to the low compression ratio early.

Figure 11:
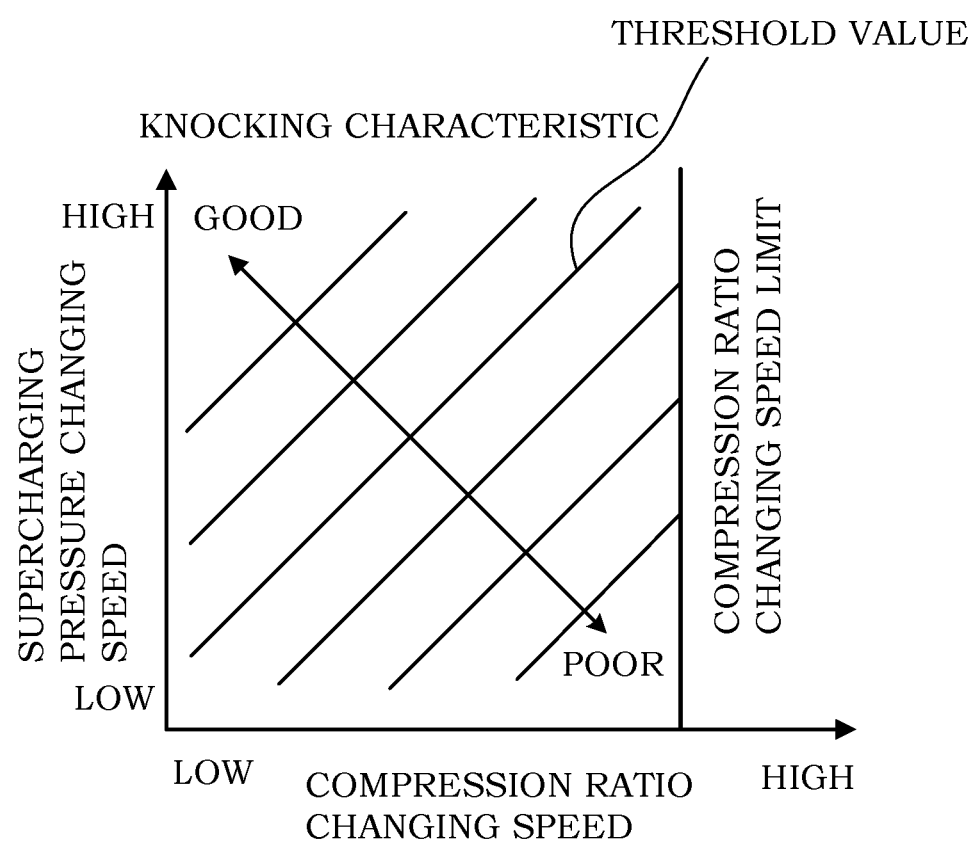
FIG. 11 is an explanatory view of a relationship between the compression-ratio changing speed and a supercharging pressure changing speed.

FIG. 11 is an explanatory view of a relationship between the compression ratio changing speed and the supercharging pressure changing speed. In FIG. 11, the lateral axis indicates the compression ratio changing speed, and the vertical axis indicates the supercharging pressure changing speed. Here, the compression ratio changing speed is a speed at which the variable compression-ratio mechanism 101 can change the mechanical compression ratio. The supercharging pressure changing speed is a changing speed of the supercharging pressure in the turbo supercharger 7.

Moreover, FIG. 11 illustrates a compression ratio changing speed limit. Since the variable compression-ratio mechanism 101 changes the mechanical compression ratio by the compression-ratio changing actuator 131, the compression ratio changing speed is limited by an operating speed of the compression-ratio changing actuator. Thus, the compression ratio changing speed cannot be made higher than the compression ratio changing speed limit. It is needless to say that the supercharging pressure changing speed also has a limit, but since the compression ratio changing speed is slower than the supercharging pressure changing speed, its limit comes earlier.

Moreover, FIG. 11 illustrates a plurality of threshold values of knocking characteristics. The knocking characteristics are different depending on the engine 100. The engine with excellent knocking characteristics has a line of the threshold value closer to "good" in the figure, while the engine with poor knocking characteristics has a line of the threshold value closer to "poor" in the figure.

Then, according to the line indicating the threshold value of the knocking characteristics, when the compression ratio changing speed is high, the changing speed of the supercharging pressure can be also made high. The changing speed of the supercharging pressure has a substantially proportional relationship with the T/C revolution of the turbo supercharger 7. Thus, if the compression ratio changing speed is high, the T/C revolution speed threshold value of the T/C revolution can be also set high in general.

From the above, it is known that the target compression ratio can be acquired from the engine revolution speed and the T/C revolution speed, but if the operation speed of the compression-ratio changing actuator 131 is high, and the compression ratio changing speed is high, the T/C revolution speed threshold value can be also set high for that portion.

In executing the aforementioned control, it may be so configured that the waste gate valve 19 is closed even after the T/C revolution speed falls below the T/C revolution speed threshold value Tt. By configuring as above, the supercharging pressure is held, and the revolution speed of the turbo supercharger 7 can be raised rapidly at the re-acceleration request. And even if the T/C revolution speed can be raised rapidly, since the mechanical compression ratio is maintained low as described above, occurrence of knocking can be suppressed.

Subsequently, effects of this embodiment will be described.

According to the aforementioned embodiment, the engine 100 includes the variable compression-ratio mechanism 101 for changing the mechanical compression ratio of the engine 100 and the turbo supercharger 7 for supplying a compressed air to the engine 100. And the controller 50 controls the variable compression-ratio mechanism 101 by setting the target compression ratio such that the higher the responsiveness of the supercharging pressure rise by the turbo supercharger 7 is, the lower the target compression ratio becomes.

By configuring as above, the higher the responsiveness of the supercharging pressure rise by the turbo supercharger 7 is, to the lower target compression ratio the mechanical compression ratio can be set. And the mechanical compression ratio can be rapidly returned to the low compression ratio at which knocking cannot occur easily even if the supercharging pressure rises by the re-acceleration request. That is, since occurrence of knocking at the re-acceleration request can be suppressed, retard of the ignition timing can be also suppressed. And torque response and the in-use fuel economy can be improved.

Moreover, the target compression ratio is a mechanical compression ratio which can lower the mechanical compression ratio to a degree capable of suppressing knocking even if the variable compression-ratio mechanism 101 is operated after the re-acceleration request. By configuring as above, the target compression ratio which can suppress occurrence of knocking at the re-acceleration request can be appropriately determined.

Moreover, the controller 50 determines that the higher the exhaust energy of the engine 100 is, the higher the responsiveness of the supercharging pressure rise is. The exhaust energy of the engine 100 and the responsiveness of the supercharging pressure rise by the turbo supercharger 7 have a correlation. Thus, by configuring as above, the target compression ratio at which knocking cannot occur easily can be appropriately determined on the basis of the exhaust energy of the engine 100.

Moreover, the controller 50 determines that the higher the revolution speed of the turbo supercharger 7 is, the higher the responsiveness of the supercharging pressure rise is. The revolution speed of the turbo supercharger 7 and the responsiveness of the supercharging pressure rise by the turbo supercharger 7 have a correlation. Thus, by configuring as above, the target compression ratio at which knocking cannot occur easily can be appropriately determined on the basis of the revolution speed of the turbo supercharger 7.

Moreover, the controller 50 controls the variable compression-ratio mechanism 101 so that, when the T/C revolution speed falls below the T/C revolution speed threshold value, the raising of the mechanical compression ratio is started. By configuring as above, fuel economy after deceleration can be improved by increasing the mechanical compression ratio. Moreover, timing of increasing the mechanical compression ratio is delayed until the T/C revolution speed falls below the T/C revolution speed threshold value. Thus, even if the acceleration/deceleration request changes from the deceleration request to the acceleration request, and the revolution speed of the turbo supercharger 7 rises, the mechanical compression ratio can be lowered to the mechanical compression ratio at which knocking cannot occur easily. At this time, since the T/C revolution speed threshold value is determined by considering the lowering speed of the mechanical compression ratio and the rising speed of the revolution speed of the turbo supercharger 7, occurrence of knocking can be suppressed more reliably.

Moreover, the higher the revolution speed of the engine 100 is, the lower the T/C revolution speed threshold value is set. Ease of rising of the T/C revolution speed is different depending on the revolution speed of the engine 100. Thus, by changing the T/C revolution speed threshold value in accordance with the revolution speed of the variable compression ratio engine 100, the T/C revolution speed threshold value regulating timing of maintaining the mechanical compression ratio at the low mechanical compression ratio can be determined appropriately.

Moreover, it is preferable that the waste gate valve 19 for allowing the exhaust gas between the variable compression ratio engine 100 and the turbo supercharger 7 to escape is provided, and the waste gate valve 19 is closed even after the revolution speed of the turbo supercharger 7 falls below the predetermined speed. By configuring as above, the supercharging pressure is held, and the revolution speed of the turbo supercharger 7 can be raised rapidly at re-acceleration. And even if the revolution speed of the turbo supercharger 7 can be raised rapidly as described above, since the mechanical compression ratio is maintained low, occurrence of knocking can be suppressed.

Moreover, the engine system 1 includes the T/C revolution speed detection sensor 32 for detecting the revolution speed of the turbo supercharger 7. By configuring as above, since the revolution speed of the turbo supercharger 7 can be directly measured, the variable compression-ratio mechanism 101 can be controlled on the basis of the accurate revolution speed of the turbo supercharger 7.

Moreover, the controller 50 obtains a load situation of an operation of the engine 100, and if the operation of the engine 100 changes from a low load to a high load, the controller 50 changes the compression ratio from the high compression ratio to the low compression ratio. Moreover, if the operation of the engine 100 changes from the high load to the low load, after the intensity of the exhaust energy falls to a predetermined value or less, the compression ratio is returned from the low compression ratio to the high compression ratio. By configuring as above, occurrence of knocking can be suppressed at the re-acceleration request and thus, retard of the ignition timing can be also suppressed. And the torque response and the in-use fuel economy can be improved.

Moreover, when the T/C revolution speed is obtained, and if the T/C revolution speed falls to a predetermined value or less, it can be determined that the intensity of the exhaust energy becomes a predetermined value or less. At this time, the T/C revolution speed may be detected or may be estimated. Moreover, when the exhaust temperature on the upstream side of the turbo supercharger 7 is obtained, and if the exhaust temperature falls to a predetermined value or less, it can be determined that the intensity of the exhaust energy becomes a predetermined value or less. At this time, the exhaust temperature may be detected or may be estimated. Moreover, when the exhaust pressure on the upstream side of the turbo supercharger 7 is obtained, and if the exhaust pressure falls to a predetermined value or less, it can be determined that the intensity of the exhaust energy becomes a predetermined value or less. At this time, the exhaust pressure may be detected or may be estimated.

Second Embodiment

Figure 12:
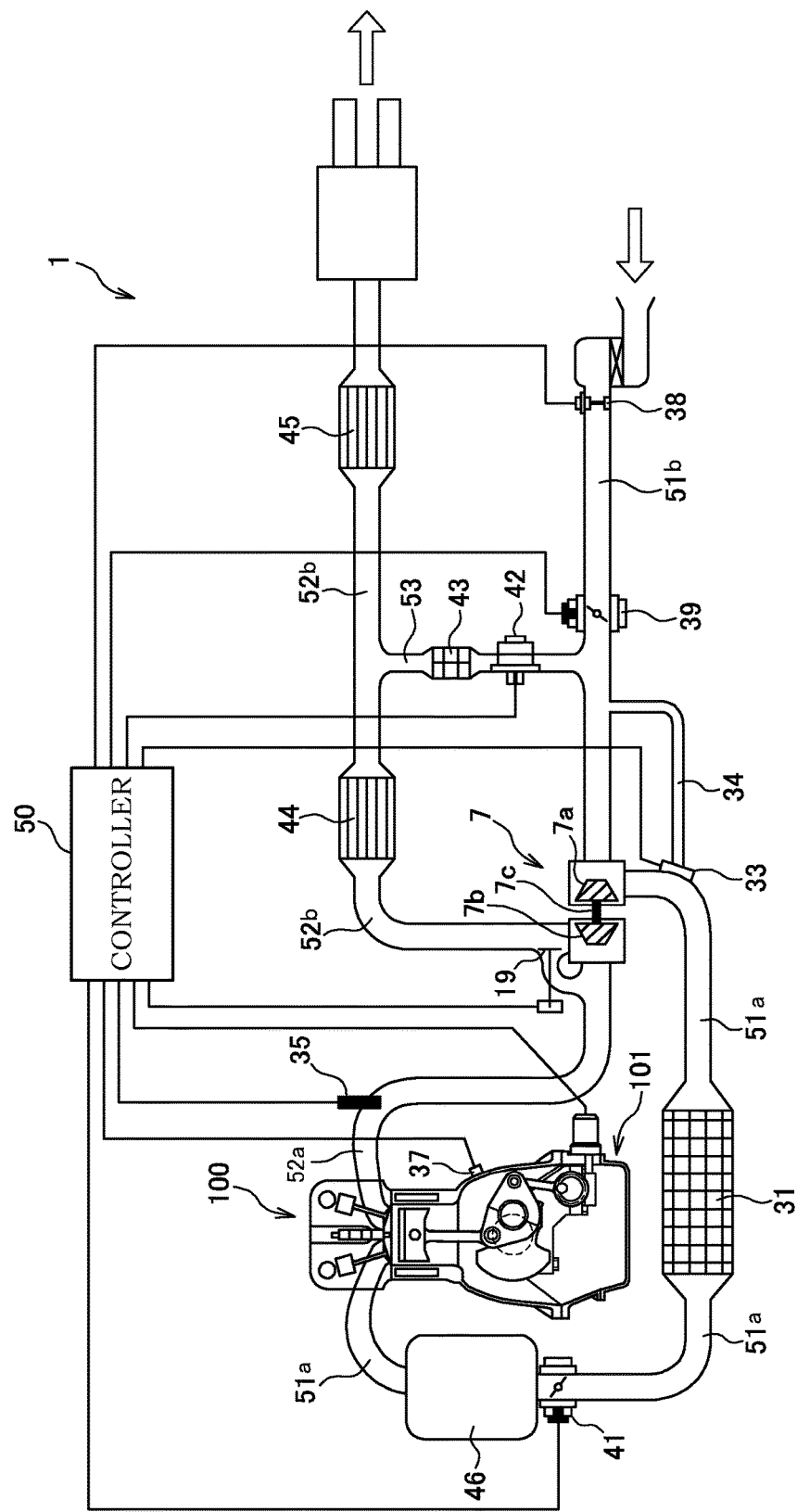
FIG. 12 is a configuration view of an engine system in a second embodiment.

FIG. 12 is a configuration view of an engine system in a second embodiment. In the aforementioned first embodiment, the revolution speed of the turbo supercharger 7 is measured by using the T/C revolution speed sensor, but in the second embodiment, the exhaust temperature is measured, and the T/C revolution speed is estimated from this exhaust temperature.

Thus, in the engine system 1 illustrated in FIG. 12, instead of the T/C revolution speed sensor, an exhaust temperature sensor 35 is provided on the exhaust passage 52. The exhaust temperature sensor 35 is connected to the controller 50. And the controller 50 can obtain the exhaust temperature.

Figure 13:
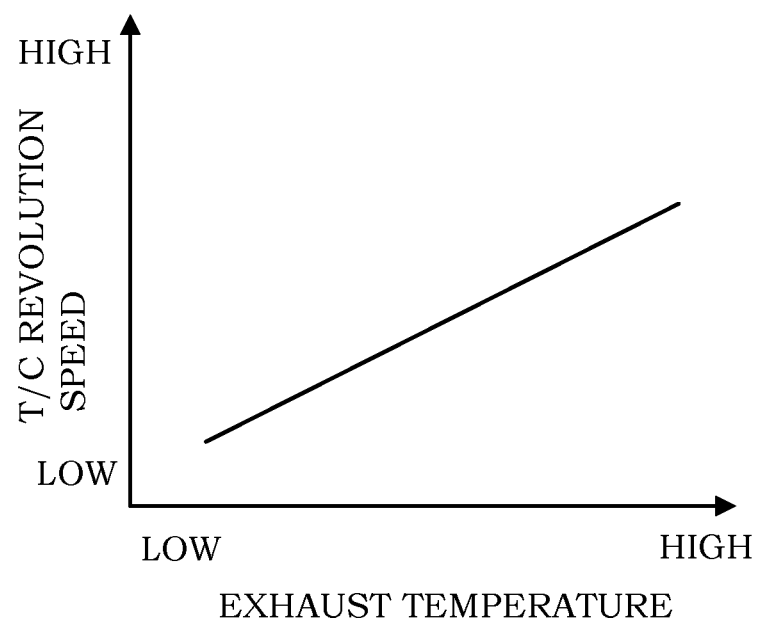
FIG. 13 is an explanatory view of the T/C revolution speed with respect to an exhaust temperature.

FIG. 13 is an explanatory view of the T/C revolution speed with respect to the exhaust temperature. In the graph in FIG. 13, the lateral axis indicates the exhaust temperature, and the vertical axis indicates the T/C revolution speed. As illustrated in FIG. 13, the higher the exhaust temperature rises, the higher the T/C revolution speed also becomes.

The controller 50 stores a map of the T/C revolution speed with respect to the exhaust temperature as illustrated in FIG. 13. And it estimates the T/C revolution speed on the basis of the obtained exhaust temperature. The controller 50 executes the control in the aforementioned first embodiment on the basis of the estimated T/C revolution speed.

By configuring as above, even if the T/C revolution speed cannot be directly measured, the T/C revolution speed can be obtained on the basis of the exhaust temperature, and the control can be executed.

Third Embodiment

Figure 14:
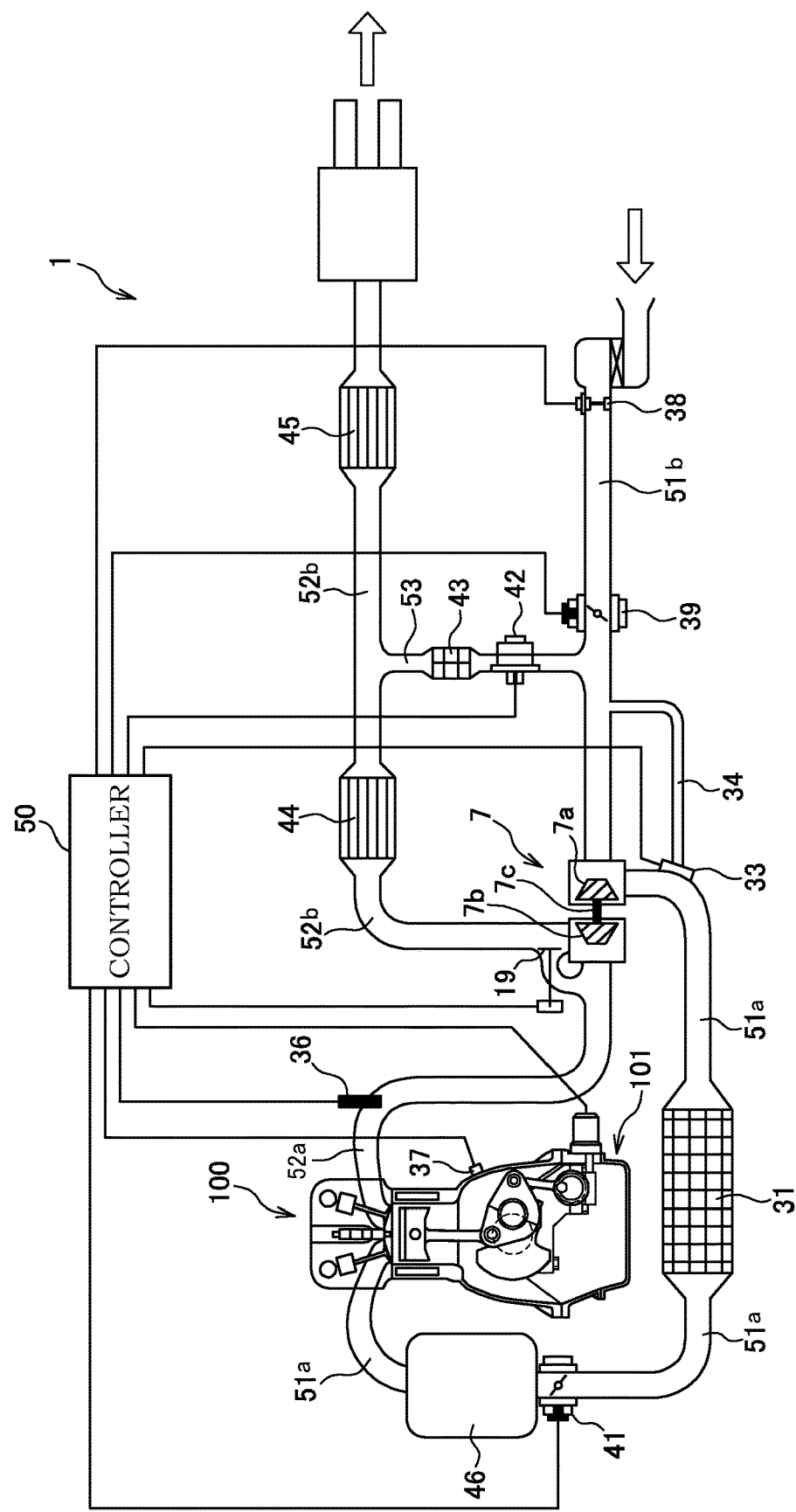
FIG. 14 is a configuration view of an engine system in a third embodiment.

FIG. 14 is a configuration view of an engine system in a third embodiment. In the third embodiment, an exhaust pressure is measured, and the T/C revolution speed is estimated from this exhaust pressure. Thus, in the engine system 1 illustrated in FIG. 14, instead of the T/C revolution speed sensor, a pressure sensor 36 is provided on the exhaust passage 52. The pressure sensor 36 is connected to the controller 50. As a result, the controller 50 can obtain an exhaust pressure.

Figure 15:
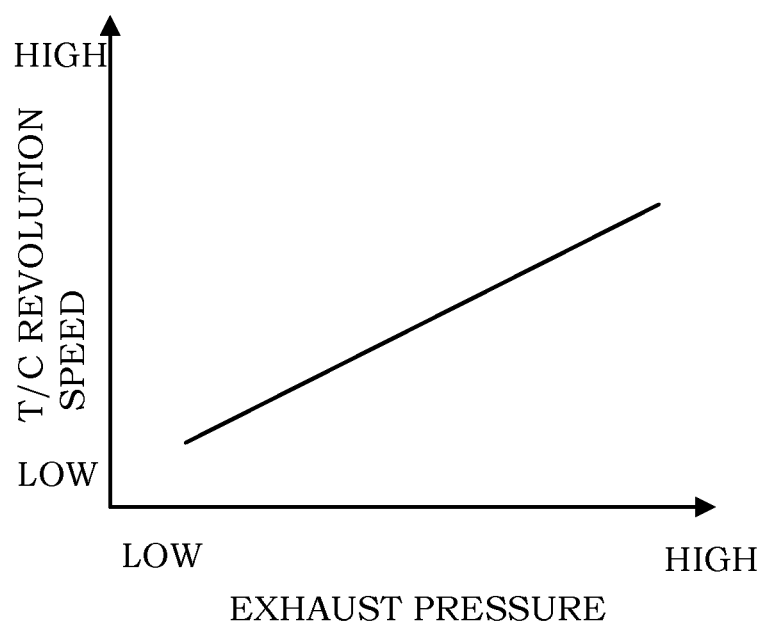
FIG. 15 is an explanatory view of the T/C revolution speed with respect to an exhaust pressure.

FIG. 15 is an explanatory view of the T/C revolution speed with respect to the exhaust pressure. In the graph in FIG. 15, the lateral axis indicates the exhaust pressure, and the vertical axis indicates the T/C revolution speed. As illustrated in FIG. 15, as the exhaust pressure becomes high, the T/C revolution speed tends to be high.

The controller 50 stores a map of the T/C revolution speed with respect to the exhaust pressure as illustrated in FIG. 15. Then, it estimates the T/C revolution speed on the basis of the obtained exhaust pressure. The controller 50 can execute control by obtaining the estimated T/C revolution speed.

By configuring as above, even if the T/C revolution speed cannot be directly measured, the T/C revolution speed can be obtained on the basis of the exhaust pressure, and the control can be executed.

The embodiments of the present invention have been described, but the aforementioned embodiments only illustrate a part of application examples of the present invention and are not intended to limit the technical scope of the present invention to specific configuration of the aforementioned embodiments. For example, the turbo supercharger 7 may be a supercharger.

Each of the aforementioned embodiments has been described as the respective independent embodiments, but they may be combined as appropriate.

The invention claimed is:

1. A control device of an engine, the engine including a variable compression-ratio mechanism adapted to change a compression ratio of the engine, and a supercharger adapted to supercharge an intake air by using exhaust energy of the engine, the device comprising:
   a controller configured to receive a load situation of the engine and to control the variable compression-ratio mechanism in accordance with the load situation of the engine, wherein
   the controller is further configured to:
      set a compression ratio higher when the engine operates in a low load than when the engine operates in a high load that is higher than the low load; and
      when the operation of the engine changes from the high load to the low load, delay a change of the compression ratio while a revolution speed of the supercharger is higher than a predetermined value, as compared with a case where the operation of the engine does not change from the high load to the low load.

2. The control device according to claim 1, wherein the controller is further configured to allow a change from a low compression ratio to a high compression ratio when the revolution speed of the supercharger falls to the predetermined value or less.

3. The control device according to claim 1, wherein the controller is further configured to:
   set a target compression ratio in accordance with the revolution speed of the supercharger; and
   control the variable compression-ratio mechanism such that the target compression ratio is reached when the revolution speed of the supercharger has fallen to the predetermined value or less.

4. The control device according to claim 1, wherein the higher a revolution speed of the engine is, the lower the predetermined value is.

5. The control device according to claim 1, wherein the engine comprises a waste gate valve adapted to allow an exhaust gas between the engine and the supercharger to escape; and
   the controller is further configured to maintain the waste gate valve in a closed state even after the revolution speed of the supercharger lowers below the predetermined value.

6. The control device according to claim 1, further comprising a revolution speed detection sensor configured to detect the revolution speed of the supercharger.

7. The control device according to claim 1, wherein the controller is further configured to estimate the revolution speed of the supercharger on the basis of an exhaust temperature in an exhaust passage on an upstream side of the supercharger or a pressure in the exhaust passage on the upstream side of the supercharger.

8. A control method of an engine, the engine including a variable compression-ratio mechanism adapted to change a compression ratio of the engine, and a supercharger adapted to supercharge an intake air by using exhaust energy of the engine, the method comprising:
   detecting a load situation of an operation of the engine;
   changing the compression ratio from a high compression ratio to a low compression ratio that is lower than the high compression ratio when the operation of the engine changes from a low load to a high load that is higher than the low load; and
   returning the compression ratio from the low compression ratio to the high compression ratio after intensity of the exhaust energy has fallen to a predetermined value or less, when the operation of the engine changes from the high load to the low load.

9. The control method according to claim 8, further comprising:
   detecting a revolution speed of the supercharger; and
   determining that the intensity of the exhaust energy has fallen to the predetermined value or less when the revolution speed of the supercharger falls to a predetermined speed or less.

10. The control method according to claim 8, further comprising:
    detecting an exhaust temperature on an upstream side of the supercharger; and
    determining that the intensity of the exhaust energy has fallen to the predetermined value or less when the exhaust temperature on the upstream side of the supercharger falls to a predetermined temperature or less.

11. The control method according to claim 8, further comprising:
    detecting an exhaust pressure on an upstream side of the supercharger; and
    determining that the intensity of the exhaust energy has fallen to the predetermined value or less when the exhaust pressure on the upstream side of the supercharger falls to a predetermined pressure or less.

12. The control method according to claim 8,
    wherein the compression ratio is returned from the low compression ratio to the high compression ratio only after intensity of the exhaust energy has fallen to a predetermined value or less, when the operation of the engine changes from the high load to the low load.

* * * * *